United States Patent
Sofia et al.

(10) Patent No.: US 11,163,909 B2
(45) Date of Patent: Nov. 2, 2021

(54) USING MULTIPLE SIGNATURES ON A SIGNED LOG

(71) Applicant: International Business Machines Corporation, Armonk, NY (US)

(72) Inventors: Anthony Thomas Sofia, Hopewell-Junction, NY (US); Peter Sutton, Lagrangeville, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 440 days.

(21) Appl. No.: 16/192,124

(22) Filed: Nov. 15, 2018

(65) Prior Publication Data

US 2020/0159964 A1    May 21, 2020

(51) Int. Cl.
    *G06F 21/64*    (2013.01)
    *G06F 16/23*    (2019.01)
    *G06F 21/55*    (2013.01)

(52) U.S. Cl.
    CPC .......... *G06F 21/64* (2013.01); *G06F 16/2358* (2019.01); *G06F 21/552* (2013.01); *G06F 21/554* (2013.01)

(58) Field of Classification Search
    CPC .... G06F 21/64; G06F 16/2358; G06F 21/552; G06F 21/554
    See application file for complete search history.

(56) References Cited

U.S. PATENT DOCUMENTS

| | | | |
|---|---|---|---|
| 8,230,228 B2 * | 7/2012 | Hahn | G06F 21/64 |
| | | | 713/179 |
| 8,967,477 B2 | 3/2015 | Braams | |
| 9,864,878 B2 | 1/2018 | Sofia et al. | |
| 2002/0038424 A1 * | 3/2002 | Joao | H04L 9/321 |
| | | | 713/176 |
| 2005/0004899 A1 * | 1/2005 | Baldwin | G06Q 10/10 |
| 2005/0033777 A1 * | 2/2005 | Moraes | G06F 16/27 |

(Continued)

OTHER PUBLICATIONS

Xiao etal, "GlobalView: building global view with log files in a distributed/networked system for accountability" Sep. 21, 2011 published by Security and Communication Networks, Sep. 21, 2011. (Year: 2011).*

(Continued)

*Primary Examiner* — Jung W Kim
*Assistant Examiner* — Bruce S Ashley
(74) *Attorney, Agent, or Firm* — Cantor Colburn LLP; Teddi Maranzano

(57) ABSTRACT

Embodiments include method, systems and computer program products for validating an event record. The method includes securing, by a processor, a log of one or more events being performed a computer by adding tamper detection to the log. Securing includes generating, by the processor, a first event record in response to an event being performed by the computer and generating, by the processor, a second event record in response to the first event record being generated. The second event record includes a first signature and a second signature corresponding to the first event record. The processor, in response to a request to detect tampering of the first event record, validates the first event record based on the first signature and the second signature in the second event record.

17 Claims, 6 Drawing Sheets

300

(56) References Cited

U.S. PATENT DOCUMENTS

| | | | | |
|---|---|---|---|---|
| 2005/0232421 | A1* | 10/2005 | Simons | H04L 63/12 |
| | | | | 380/255 |
| 2009/0076960 | A2 | 3/2009 | Hamel et al. | |
| 2011/0131453 | A1 | 6/2011 | Fernandess et al. | |
| 2012/0089830 | A1* | 4/2012 | Kande | G06F 21/645 |
| | | | | 713/155 |
| 2015/0188715 | A1 | 7/2015 | Castellucci et al. | |
| 2017/0032148 | A1* | 2/2017 | Sofia | G06F 21/88 |
| 2017/0366342 | A1* | 12/2017 | Gehrmann | H04W 12/041 |

OTHER PUBLICATIONS

Schneier et al., "Automatic Event-Stream Notarization Using Digital Signatures," International Workshop on Security Protocols, Springer, Berlin, Heidelberg, 1996, 15 pgs.

Ma et al., "A New Approach to Secure Loggin," ACM Transactions on Storage, vol. 5, No. 1, Article 2, Publication date: Mar. 2009, 21 pgs.

Syta et al., "Keeping Authorities "Honest or Bust" with Decentralized Witness Cosigning," Security and Privacy (SP), May 30, 2016 IEEE Symposium on IEEE, 20 pgs.

\* cited by examiner

USING MULTIPLE SIGNATURES ON A SIGNED LOG

BACKGROUND

The present application relates to protecting records created by an event logger, and more specifically, to protecting records created by an existing event logger without affecting an event log processing infrastructure.

In systems such as a server, an event logger may record an event record corresponding to an event, such as a system event associated with an operation of the server. Enterprises may audit such logged event records as part of regulatory compliance. For compliance, the audit may have to verify that contents of the event record have remained unmodified or that any changes have been tracked.

SUMMARY

Embodiments of the invention are directed to a method for validating an event record. A non-limiting example of the computer-implemented method includes securing, by a processor, a log of one or more events being performed a computer by adding tamper detection to the log. Securing includes generating, by the processor, a first event record in response to an event being performed by the computer and generating, by the processor, a second event record in response to the first event record being generated. The second event record includes a first signature and a second signature corresponding to the first event record. The processor, in response to a request to detect tampering of the first event record, validates the first event record based on the first signature and the second signature in the second event record.

Embodiments of the invention are directed to a computer program product that can include a storage medium readable by a processing circuit that can store instructions for execution by the processing circuit for performing a method for validating an event record. The method includes securing, by a processor, a log of one or more events being performed a computer by adding tamper detection to the log. Securing includes generating, by the processor, a first event record in response to an event being performed by the computer and generating, by the processor, a second event record in response to the first event record being generated. The second event record includes a first signature and a second signature corresponding to the first event record. The processor, in response to a request to detect tampering of the first event record, validates the first event record based on the first signature and the second signature in the second event record.

Embodiments of the invention are directed to a system. The system can include a processor in communication with one or more types of memory. The processor can be configured to secure a log of one or more events being performed a computer by adding tamper detection to the log. Securing includes configuring the processor to generate a first event record in response to an event being performed by the computer and generate a second event record in response to the first event record being generated. The second event record includes a first signature and a second signature corresponding to the first event record. The processor, in response to a request to detect tampering of the first event record, validates the first event record based on the first signature and the second signature in the second event record.

Additional technical features and benefits are realized through the techniques of one or more embodiments the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
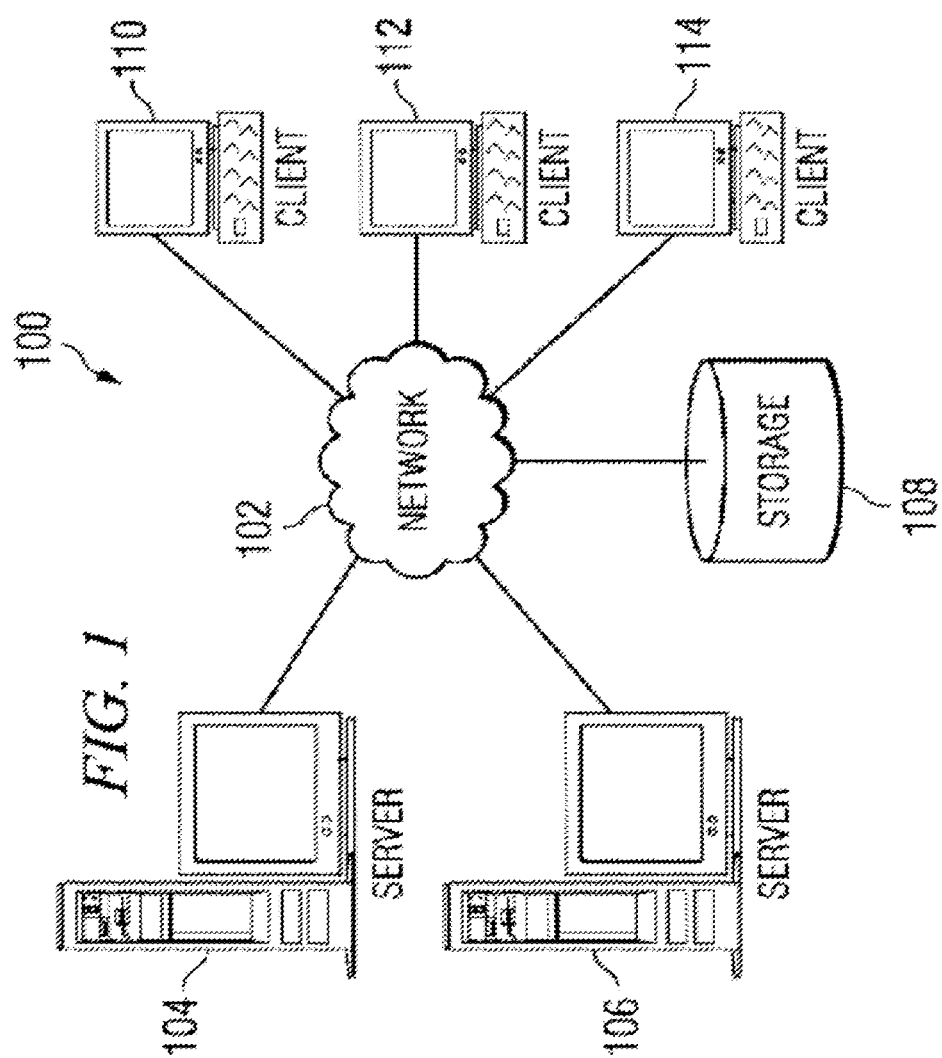
FIG. 1 is an exemplary diagram of a distributed data processing system in which exemplary aspects of the present invention may be implemented.

The diagrams depicted herein are illustrative. There can be many variations to the diagram or the operations described therein without departing from the spirit of the invention. For instance, the actions can be performed in a differing order or actions can be added, deleted, or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection".

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In accordance with exemplary embodiments of the disclosure, methods, systems, and computer program products for using multiple signatures on a signed log is described herewith.

Turning now to an overview of technologies that are more specifically relevant to aspects of the invention, embodiments of the invention are related in general to tamper detection of log data. To protect data from being tampered with or stolen, the data can be encrypted. In addition, the data can be monitored for unauthorized attempts to access the data. Currently, a digital signature can be used to validate the authenticity and integrity of a message, software or digital document. The digital signature can be based on public key cryptography. Using a single digital signature to protect data is sufficient in light of current compute capabilities; however, compute capabilities of the future (e.g., quantum computing) will most likely have enough computational power to overcome the protection provided by a single digital signature. Accordingly, to account for increased computing capabilities of the future, additional security measures are needed.

Turning now to an overview of aspects of the present invention, one or more embodiments of the invention provide methods, systems, structures and computer program products configured to enhance data security by using multiple digital signatures in a record which can be merged into a data stream to create a tamper-evident log. The multiple digital signatures can be used in combination to validate data associated with the data stream. Accordingly, multiple signatures can be applied to a single source record. The above-described aspects of the invention address the shortcomings of the prior art by providing a layered approach to protecting data using multiple digital signatures.

With reference now to the figures, FIG. 1 depicts a pictorial representation of an exemplary distributed data processing system in which aspects of the illustrative embodiments of the present invention may be implemented. Distributed data processing system 100 may include a network of computers in which embodiments of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown. Servers 104 and 106 can be associated with different companies, for example, an acquiring company and a target company.

In the depicted example, distributed data processing system 100 is the Internet with network 102 representing a worldwide collection of networks and gateways that can use a variety of communication protocols (e.g., Transmission Control Protocol/Internet Protocol (TCP/IP)) to communicate with one another. At the heart of the Internet is a backbone of high-speed data communication lines between major nodes or host computers, consisting of thousands of commercial, governmental, educational, and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the exemplary embodiments of the present invention may be implemented.

Figure 2:
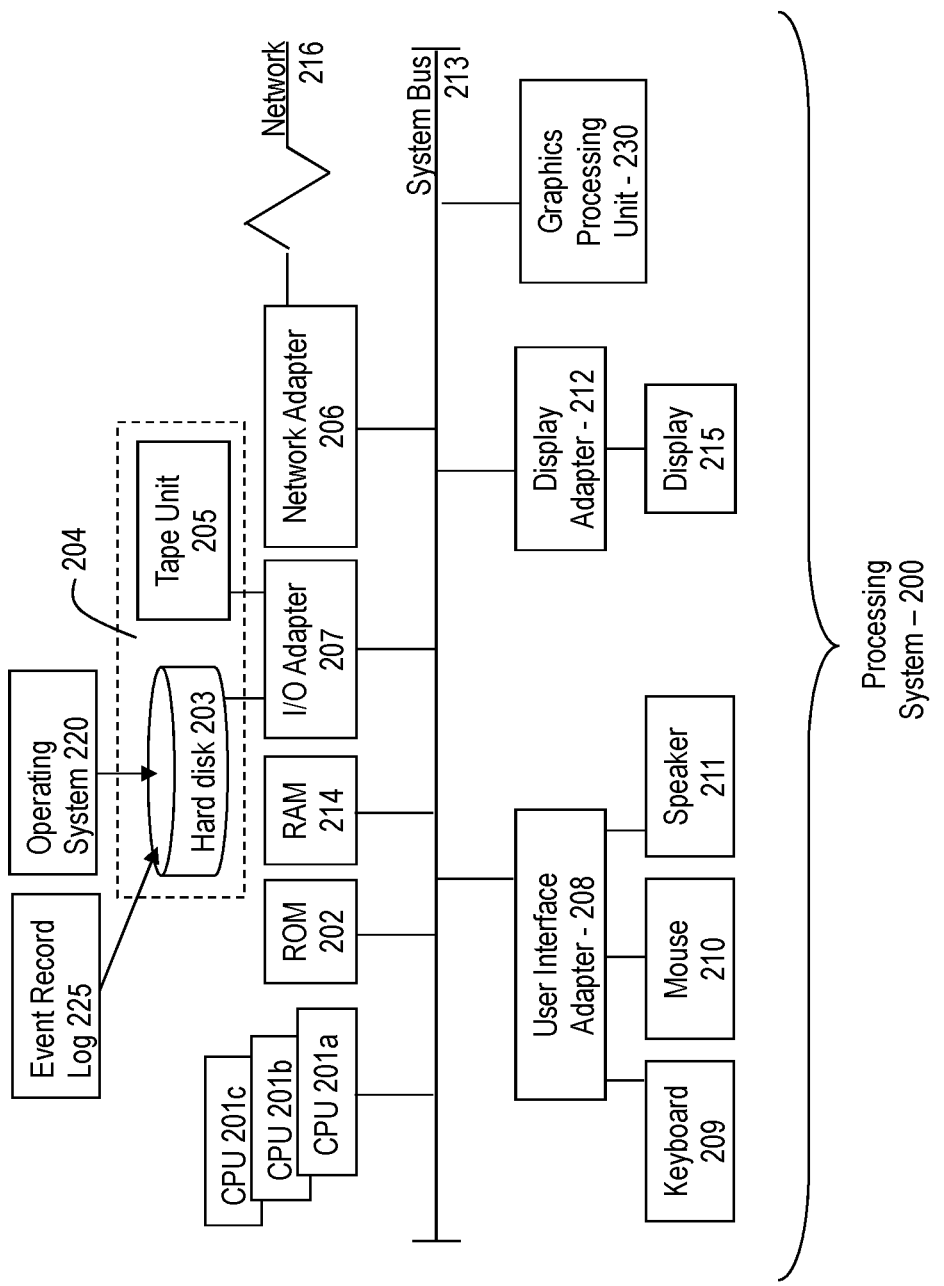
FIG. 2 is a block diagram illustrating one example of a processing system for practice of the teachings herein.

With reference now to FIG. 2, a block diagram of an exemplary processing system 200 is shown in which aspects of the exemplary embodiments of the present invention may be implemented. Processing system 200 is an example of a computer, such as server 104 or client 110 in FIG. 1, in which computer usable code or instructions implementing the processes for exemplary embodiments of the present invention may be located. In this embodiment, the processing system 200 has one or more central processing units (processors) 201a, 201b, 201c, etc. (collectively or generically referred to as processor(s) 201). In one embodiment, each processor 201 may include a reduced instruction set computer (RISC) microprocessor. Processors 201 are coupled to system memory 214 and various other components via a system bus 213. Read only memory (ROM) 202 is coupled to the system bus 213 and may include a basic input/output system (BIOS), which controls certain basic functions of system 200.

FIG. 2 further depicts an input/output (I/O) adapter 207 and a network adapter 206 coupled to the system bus 213. I/O adapter 207 may be a small computer system interface (SCSI) adapter that communicates with a hard disk 203 and/or tape storage drive 205 or any other similar component. I/O adapter 207, hard disk 203, and tape storage device 205 are collectively referred to herein as mass storage 204. A network adapter 206 interconnects bus 213 with an outside network 216 enabling data processing system 200 to communicate with other such systems. A screen (e.g., a display monitor) 215 is connected to system bus 213 by display adaptor 212, which may include a graphics adapter to improve the performance of graphics intensive applications and a video controller. In one embodiment, adapters 207, 206, and 212 may be connected to one or more I/O busses that are connected to system bus 213 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 213 via user interface adapter 208 and display adapter 212. A keyboard 209, mouse 210, and speaker 211 are all interconnected to system bus 213 via user interface adapter 208, which may include, for example, a Super I/O chip integrating multiple device adapters into a single integrated circuit.

In exemplary embodiments, the processing system 200 includes a graphics processing unit 230. Graphics processing unit 230 is a specialized electronic circuit designed to manipulate and alter memory to accelerate the creation of images in a frame buffer intended for output to a display. In general, the graphics processing unit 230 is very efficient at manipulating computer graphics and image processing, and has a highly parallel structure that makes it more effective than general-purpose CPUs for algorithms where processing of large blocks of data is done in parallel.

Thus, as configured in FIG. 2, the processing system 200 includes processing capability in the form of processors 201, storage capability including system memory 214 and mass storage 204, input means such as keyboard 209 and mouse 210, and output capability including speaker 211 and display 215. In one embodiment, a portion of system memory 214 and mass storage 204 collectively store an operating system 220 and event record log 225.

The operating system 220 essentially controls the execution of other computer programs by the processor 201 and provides scheduling, input-output control, file and data management, memory management, and communication control and related services. The operating system 220 also coordinates and provides control of various components within the processing system 200. As used by a client, for example, client 110, the operating system 220 may be a commercially available operating system, for example, UNIX, Linux, Windows, or the like. A user interacting with the processing system 200 through operating system 220 can use a command-line interface/interpreter, i.e., a shell. The user can control the operation of the processing system 200 by entering commands as text for the command line interpreter to execute, or by creating text (shell scripts) of one or more such commands.

The event record log 225 includes one or more event records a-x. An event record is a data record describing an operation of the server and/or client. The operating system 220, using the processor 201, records the event record in response to the operation being initiated and/or completed. For example, the event may be a startup event of the server and/or client, a file creation event, a file copy event, a user login event, or any other event that the operating system 220 may detect. The operating system 220 may be configured to detect a predetermined type of events. For example, the operating system 220 may be configured to detect 'file' type events such as a file creation event, a file copy event, a file move event, a file deletion event, a file modification event, or any other file event. In addition or alternatively, the operating system 220 may be configured to detect 'user' type events such as a user login event, a user logout event, a user profile change event and other user events. Other event types are possible and above are just a few examples.

The event record is stored using a predetermined format. For example, the event record may include a header and a payload. The payload includes a description of the corresponding event. For example, if the corresponding event is a file event, the payload includes a file identification, a file location, an indication of the operation performed, and other information describing the event. The header includes metadata that describes the payload, such as a length of the payload, a timestamp, or the like. The event record may be a file. Alternatively, the event record may be an entry within a file or a stream, such as a log stream.

The event record log 225 is used to validate the operation of the server and/or client. For example, the operating system 220 may include a System Management Facilities (SMF). The SMF Enterprises may use the event record log 225 to show regulatory compliance. For example, to be compliant, the server and/or client may have to perform operations in a predetermined manner. The SMF facilitates querying the event record log 225, such as via an Application Programming Interface (API), to ensure that the server and/or client was compliant with the predetermined manner of operations. In this regard, the SMF or a system auditor operates according to the predetermined format of the event record. Hence, modifying the predetermined format may cause the system auditor and the SMF to cease from current operations.

Regulatory compliance may make it vital for the SMF to ensure that the event records in the event record log 225 have not been tampered with. Addition of such tamper detection record, as described in this document, may cause the SMF and system auditor to be modified, thus leading to additional costs. The examples described throughout the present document provide technical solutions to this technical problem.

Figure 3:
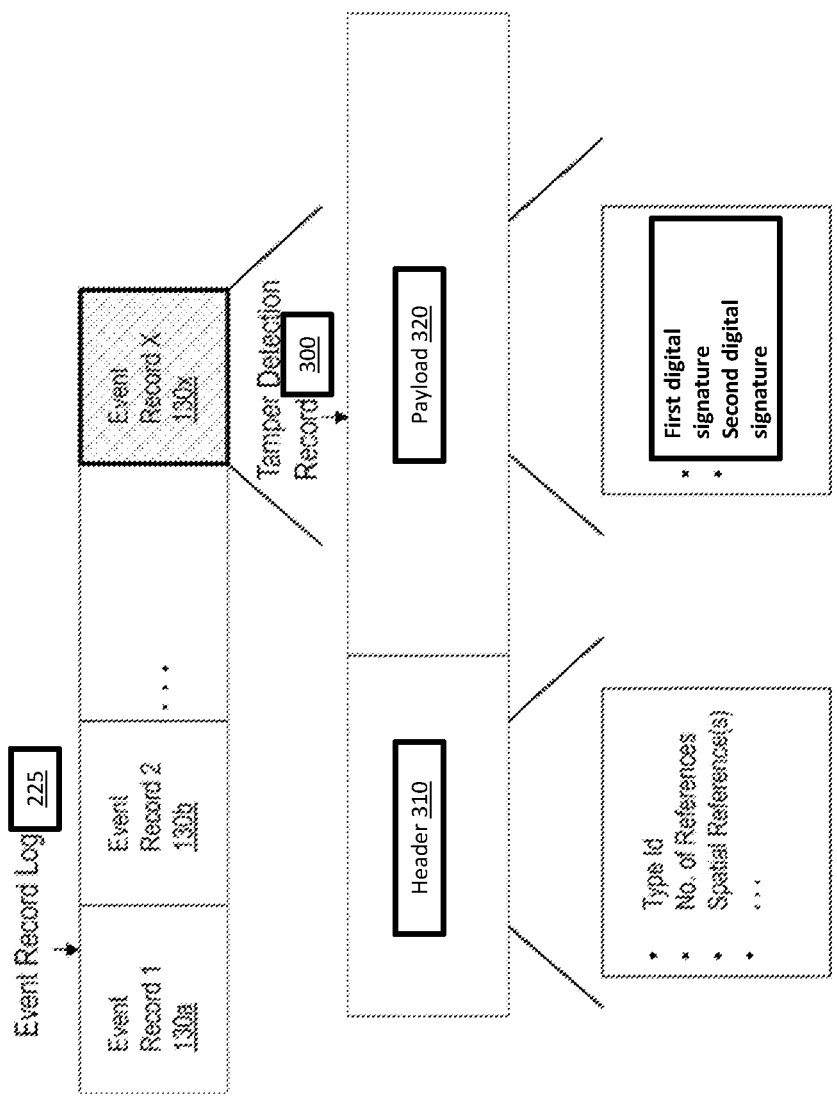
FIG. 3 is a block diagram illustrating an exemplary event record log including a tamper detection record according to one or more embodiments of the present invention.

FIG. 3 illustrates an example event record log 225 including a tamper detection record 300. The processor 201 can generate an event record 130a. In response, the operating system 220 may additionally generate a metadata that includes tamper detection information for the event record 130a. The operating system 220 may record, or format the tamper detection information as a separate event record 130x, referred to as the tamper detection record 300 in the present document. The operating system 220 can subsequently record the tamper detection record 300 in the event record log 225. Thus, the processor 201 can insert a separate recording into the event record log that contains the tamper detection information of the event record 130a. The tamper detection record 300 may use the same predetermined format of the event records.

For example, as shown in FIG. 3, the tamper detection record 300 includes a header 310 and a payload 320. The payload 320 can include a first digital signature and a second digital signature for the corresponding event record 130a. The first digital signature and the second digital signature demonstrates the authenticity of the corresponding event record 130a. The second digital signature can be activated or deactivated based on a level of security desired, i.e., the second digital signature can be activated to provide an enhanced level of security or de-activated to provide a normal level of security. The activation of the second digital signature by a user can occur in response to an associated parameter being set in the operating system 220. Accordingly, the second digital signature can be used in instances in which enhanced security is desired. Having the ability to de-activate the second digital signature is beneficial because memory space can be saved and additional computing needed to process the second digital signature does not occur in instances in which enhanced security is not desired.

The first digital signature and/or the second digital signature can be encrypted such as using asymmetric cryptography or any other type of encryption techniques. For example, the first digital signature and the second digital signature can be based on contents of the event record 130a, a private key, a public key, a timestamp, or other information of the event associated with the event record 130a.

Contents of the event record 130a can be hashed, such as using a hashing scheme prior to encryption. An associated hash value can be calculated based on the first digital signature and the second digital signature when the second digital signature is activated, or based on the first digital signature when the second digital signature is de-activated. The hash can be based on a Secure Hash Algorithm 2 (SHA2) or Secure Hash Algorithm 3 (SHA3). The first digital signature and the second digital signature can each use a different hash or the same hash. If the first digital signature and the second digital signature use the same hash, the hash can be re-used across digital signatures.

During the validation process, the first digital signature and/or the second digital signature used during validation can be configured. When the first digital signature and the second digital signature are used for validation, a combination of the first digital signature and the second digital signature are needed to pass for the data to be considered valid. In an event in which either the hash algorithm was compromised or a key being used was compromised, a user would invalidate an old signature and utilize a new signature to address security issues. Accordingly, to validate the event record 130a, the operating system 220 can decrypt the (first digital signature and the second digital signature) or the first digital signature in the payload 320 and compare it with the contents of the event record 130a. The header 310 may include metadata of the payload 320. For example, the header 310 may include a length of the payload 320 or a timestamp. In addition, the header 310 may include an identifier that indicates that the payload 320 contains tamper detection information.

In an example, the operating system 220 may associate the tamper detection record 300 with a single event record, such as the event record 130a. For example, the header 310 may include a spatial reference of the event record 130a. The spatial reference may be a memory location of the event record 130a. Alternatively or in addition, the spatial reference may be a spatial relation between the tamper detection record 300 and the corresponding event record 130a. The spatial reference can be explicitly or implicitly stored. If the spatial reference is explicitly stored, the location of the first event record 130a is stored in the tamper detection record 300. If the spatial reference is implicitly stored, the spatial reference is stored in relation to the data in memory or a file.

The server and/or client can use a predetermined spatial relationship between the first event record 130a and the tamper detection record 300. For example, according to the predetermined spatial relation, the first event record 130a may precede the tamper detection record 300 with no other records in between. Alternatively, the predetermined spatial relation permits other event records of a different type as the first event record 130a in between the first event record 130a and the tamper detection record 300. In an example, the other event records cannot be included in the tamper-resistant data, which is the payload 320, of the tamper detection record 300.

In an example, the operating system 220 may associate the tamper detection record 300 with more than one event record in the event record log 225, such as with the event records 130a and 130b. Accordingly, the header 310 may include spatial references to each event record that is associated with the tamper detection record 300. Additionally, the header 310 may include a number of event records that the tamper detection record 300 is associated with and the length of each respective digital signature included in the payload 320. The operating system 220 can associate the tamper detection record 300 with a predetermined number of successive event records in the event log 225. Alternatively or in addition, the number of event records associated with the tamper detection record 300 may be dynamically determined based on a number of event records stored in a predetermined memory range associated with the tamper detection record 300. The spatial reference in the header 310 may identify the memory range that is associated with the tamper detection record 300.

In another example, the operating system 220 may associate the tamper detection record 300 with events of a selected type, such as file type events, user type events, or any other type of events. For example, consider that the tamper detection record 300 is associated with file type events. If the operating system 220 generates the event record 130a in response to a file type event, the operating system 220 may associate the event record 130a with the tamper detection record 300. The header 310 of the tamper detection record 300, in such a case, may indicate an identifier of the type of event records that are associated with the tamper detection record 300. In the above example, the header 310 may include an identifier of the file type event. The operating system 220 may associate each file type event record with the tamper detection record 300.

In yet another example, the operating system 220 may associate the tamper detection record 300 with a set event records of different types. The memory locations of the event records in the set of consecutive event records may precede the tamper detection record 300 or vice versa. For example, in response to detecting two or more events of different types, the operating system 220 may generate and associate the tamper detection record 300 with the event records generated corresponding to the events. For example, the operating system 220 may generate a first event record 130a and a second event record 130b that are of different types. In this case, the operating system 220 may generate the tamper detection record 300 that is associated with the first event record 130a and the second event record 130b. In other examples, the tamper detection record 300 may be associated with more than two event records of different types.

Figure 4:
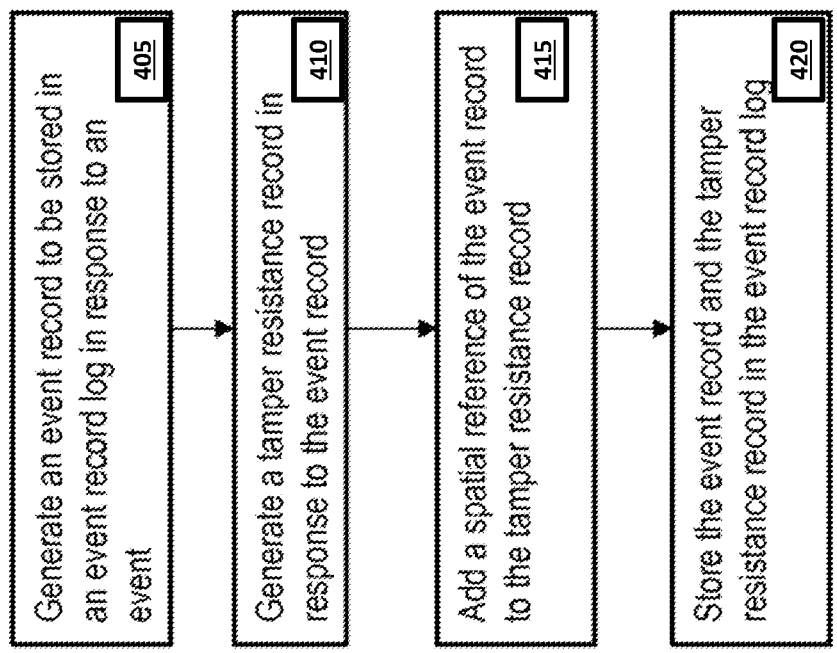
FIG. 4 is a flow diagram illustrating a method for generating a tamper detection record according to one or more embodiments of the present invention.

FIG. 4 is a flow diagram 400 illustrating a computer-implemented method for generating a tamper detection record according to one or more embodiments of the present invention. At block 405, a processor, for example, processor 201, can generate a first record (e.g., an event record) in response to detecting an occurrence of an event. For example, the processor may be configured to detect the occurrence of a predetermined event type. At block 410, the processor can generate a second record (e.g., a tamper resistance record) in response to generation of the first record. The second record can include a first digital signature, or a first digital signature and a second digital signature corresponding to the first record. At block 415, the processor can add a spatial reference associated with the first record to the second record. At block 420, the processor can store the first record and the second record in an event record log, for example, event record log 225.

Figure 5:
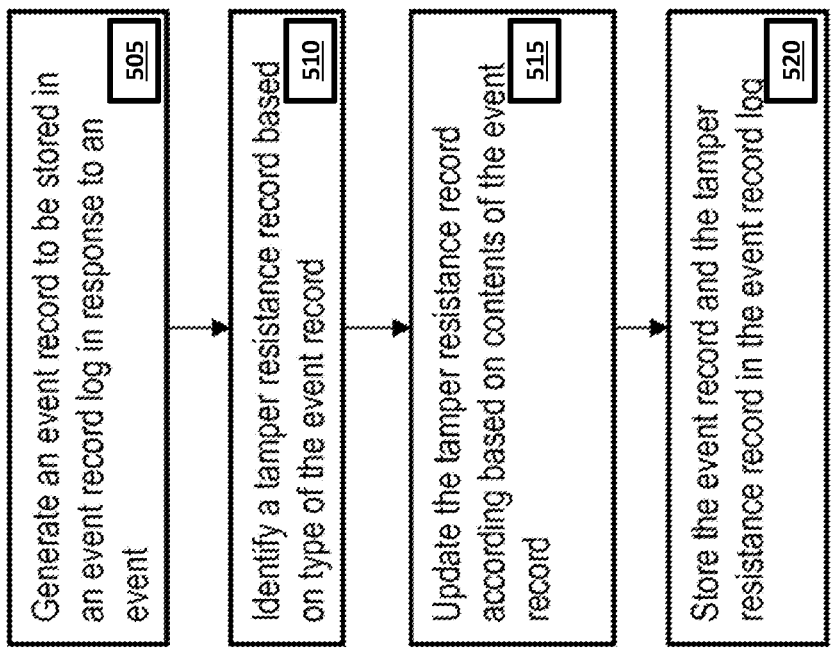
FIG. 5 is a flow diagram illustrating a method for associating an event record with a tamper detection record according to one or more embodiments of the present invention.

FIG. 5 is a flow diagram 500 illustrating a computer-implemented method for associating an event record with a tamper detection record according to one or more embodiments of the present invention. At block 505, a processor, for example, a processor 201 can generate an event record in response to an occurrence of an event. At block 510, the processor can identify a tamper detection record corresponding to the event record based on a type associated with the event record. For example, if the event is a file type event, the processor can identify a tamper detection record associated with file type events from an event record log, for example, event record log 225. At block 515, the processor can update the tamper detection record to include a first digital signature, or a first digital signature and a second digital signature corresponding to the event record, as well as a spatial reference for the event record. At block 520, the processor can store the event record and the updated tamper detection record in the event record log.

Figure 6:
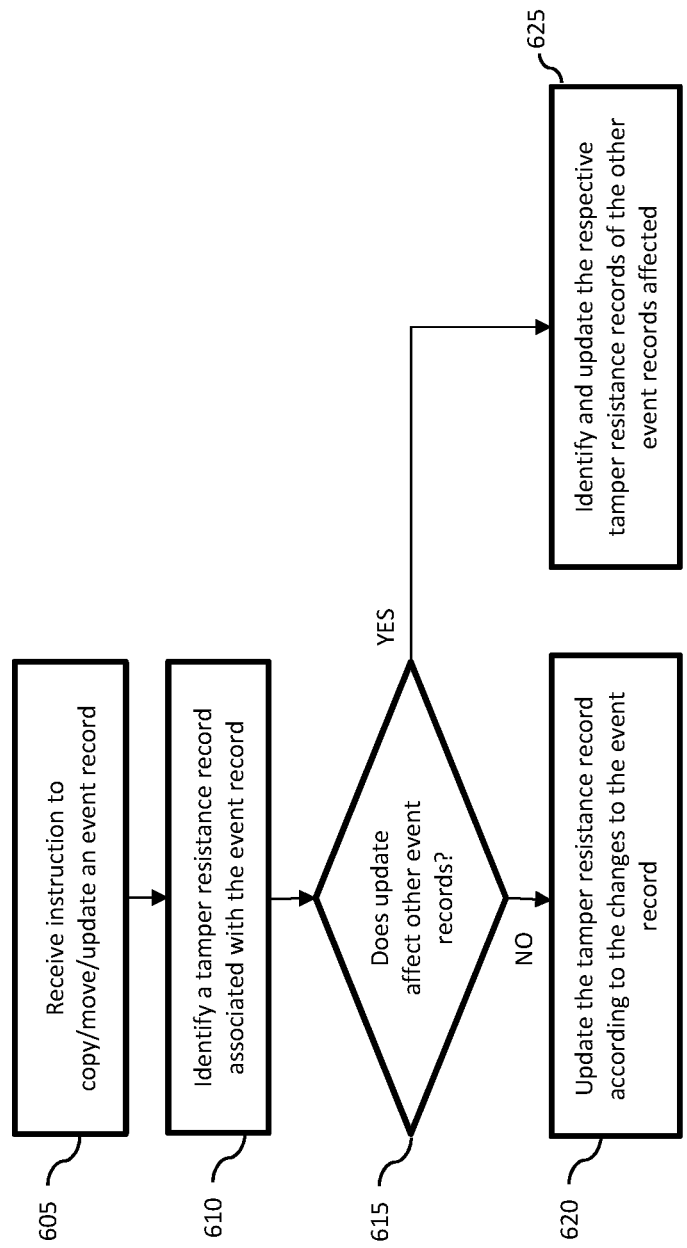
FIG. 6 is a flow diagram illustrating a method for updating an event record according to one or more embodiments of the present invention.

FIG. 6 is a flow diagram illustrating a computer-implemented method 600 for updating an event record according to one or more embodiments of the present invention. At block 605, the processor can receive an instruction to update an event record, for example, event record 130*a*. The instruction can be an instruction to copy the event record, move the event record, modify contents of the event record, or any other such instruction. At block 610, the processor can identify a tamper detection record (e.g., tamper detection record 300) that is associated with the event record.

At block 615, the processor can determine whether an update of the tamper detection record would affect other event records. If the update would not affect other event records, the method 600 proceeds to block 620 where the processor can update the tamper detection record based on the changes to the event record. For example, in response to a copy or move instruction, the processor can copy or move the tamper detection record in conjunction with the event record. Additionally or alternatively, the processor can revise the copied tamper detection record to update the spatial reference of the event record. If the update would affect other event records, the method 600 proceeds to block 625 where the processor can identify and update any tamper resistance records of the other event records affected.

The processor can also identify whether the event record is a tamper detection record or a typical event record based on an identifier in a header (e.g., header 310) associated with the event record. The processor can bypass or ignore the tamper detection record unless the processor is performing a regulatory compliance audit of the event record log. During the compliance audit, the processor can identify the tamper detection record for each respective event record to be analyzed. The processor can determine if contents of the event record have been modified, or have been tampered with by comparing the contents of the event record with the first digital signature or the first digital signature and the second digital signature stored in the payload of the tamper detection record (validation). If the validity of the contents of the event record cannot be confirmed based on the comparison, the processor can flag the event record in the audit report and/or provide another indication to a user, such as by displaying an error, an audible note, or any other user notification. If the comparison confirms the validity of the event record, the record is deemed tamper-free and the processor proceeds to analyze the next event record.

Embodiments of the present invention can enhance a level of security for stored data by providing a second authentication mechanism, i.e., a second digital signature. Embodiments of the present invention can also provide a mechanism for turning on the second authentication mechanism for use in combination with the first authentication mechanism. When the second authentication mechanism is turned on, a single hash value is calculated for both the first authentication mechanism and the second authentication mechanism. This hash is then provided to both signing functions, either in serial or in parallel.

During a validation process, either the original (first signature) or second signature can be used individually, or they can both be validated. When the combination of the first signature and second signature pass, data associated with the signatures is then considered valid. In the validation case, typically the user would eventually configure an old signature to not be validated any longer, while they continue to validate using a future-proofed signature.

Embodiments of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for validating an event record, the method comprising:
   securing, by a processor, a log of one or more events being performed by a computer by adding tamper detection to the log, the securing comprising:
      generating, by the processor, a first event record in response to an event being performed by the computer;
      generating, by the processor, a second event record in response to the first event record being generated, wherein the second event record comprises a first signature and a second signature that are both created based on contents of the first event record; and
   in response to a request to detect tampering of the first event record, validating, by the processor, the first event record based on the first signature and the second signature in the second event record,
   wherein the second signature can be activated to provide an enhanced level of security or de-activated to provide a normal level of security in response to an associated parameter being set in an operating system executing on the processor.

2. The computer-implemented method of claim 1, further comprising storing the first event record and the second event record.

3. The computer-implemented method of claim 1, further comprising:
   generating a third event record of a different type as a type of the first event record; and
   adding to the second event record, in response to the third event record being of the different type as the first event record, a first signature and a second signature corresponding to the third event record.

4. The computer-implemented method of claim 1, wherein a single hash value is calculated for the first signature and the second signature.

5. The computer-implemented method of claim 1, wherein the first signature and the second signature identify contents of the first event record.

6. The computer-implemented method of claim 5, wherein the second event record further comprises an identifier of a type of the first event record.

7. A computer program product for validating an event record, the computer program product comprising:
   a computer readable storage medium having stored thereon first program instructions executable by a processor to cause the processor to:
      secure a log of one or more events being performed by a computer by adding tamper detection to the log, the securing comprising:
         generate a first event record in response to an event being performed by the computer;
         generate a second event record in response to the first event record being generated, wherein the second event record comprises a first signature and a second signature that are both created based on contents of the first event record; and
      in response to a request to detect tampering of the first event record, validate the first event record based on the first signature and the second signature in the second event record,
   wherein the second signature can be activated to provide an enhanced level of security or de-activated to provide a normal level of security in response to an associated parameter being set in an operating system executing on the processor.

8. The computer program product of claim 7, further comprising storing the first event record and the second event record.

9. The computer program product of claim 7, further comprising:
   generating a third event record of a different type as a type of the first event record; and
   adding to the second event record, in response to the third event record being of the different type as the first event record, a first signature and a second signature corresponding to the third event record.

10. The computer program product of claim 7, wherein a single hash value is calculated for the first signature and the second signature.

11. The computer program product of claim 7, wherein the first signature and the second signature identify contents of the first event record.

12. The computer program product of claim 11, wherein the second event record further comprises an identifier of a type of the first event record.

13. A system, comprising: one or more processors; and
   at least one memory, the memory including instructions that, upon execution by at least one of the one or more processors, cause the system to perform a method for validating an event record, the method comprising:
   securing a log of one or more events being performed by a computer by adding tamper detection to the log, the securing comprising:
      generating a first event record in response to an event being performed by the computer;
      generating a second event record in response to the first event record being generated, wherein the second event record comprises a first signature and a second signature that are both created based on contents of the first event record; and
      in response to a request to detect tampering of the first event record, validating the first event record based on the first signature and the second signature in the second event record,
   wherein the second signature can be activated to provide an enhanced level of security or de-activated to provide a normal level of security in response to an associated parameter being set in an operating system executing on the one or more processors.

14. The system of claim 13, further comprising storing the first event record and the second event record.

15. The system of claim 13, further comprising:
   generating a third event record of a different type as a type of the first event record; and
   adding to the second event record, in response to the third event record being of the different type as the first event record, a first signature and a second signature corresponding to the third event record.

16. The system of claim 13, wherein a single hash value is calculated for the first signature and the second signature.

17. The system of claim 13, wherein the first signature and the second signature identify contents of the first event record.

* * * * *